United States Patent
Badding et al.

(10) Patent No.: US 8,821,771 B2
(45) Date of Patent: Sep. 2, 2014

(54) FLAME SPRAY PYROLYSIS METHOD FOR FORMING NANOSCALE LITHIUM METAL PHOSPHATE POWDERS

(71) Applicants: Michael Edward Badding, Campbell, NY (US); Jacqueline Leslie Brown, Lindley, NY (US); Curtis Robert Fekety, Corning, NY (US); Zhen Song, Painted Post, NY (US)

(72) Inventors: Michael Edward Badding, Campbell, NY (US); Jacqueline Leslie Brown, Lindley, NY (US); Curtis Robert Fekety, Corning, NY (US); Zhen Song, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 107 days.

(21) Appl. No.: 13/627,384

(22) Filed: Sep. 26, 2012

(65) Prior Publication Data

US 2014/0084503 A1    Mar. 27, 2014

(51) Int. Cl.
*C01D 15/00*    (2006.01)
(52) U.S. Cl.
USPC ............................... 264/5; 264/80
(58) Field of Classification Search
None
See application file for complete search history.

(56) References Cited

U.S. PATENT DOCUMENTS

| | | | |
|---|---|---|---|
| 6,030,909 A | 2/2000 | Fu | 501/10 |
| 6,475,677 B1 | 11/2002 | Inda et al. | 429/304 |
| 2003/0205467 A1 | 11/2003 | Fu | 204/424 |
| 2003/0221589 A1* | 12/2003 | Lee et al. | 106/401 |
| 2007/0117026 A1 | 5/2007 | Kumar et al. | 429/320 |
| 2007/0196259 A1 | 8/2007 | Stark et al. | 423/263 |
| 2010/0028782 A1 | 2/2010 | Inda | 429/305 |
| 2012/0168686 A1 | 7/2012 | Metz et al. | 252/506 |
| 2012/0282522 A1* | 11/2012 | Axelbaum et al. | 429/219 |
| 2012/0295168 A1 | 11/2012 | Holzapfel et al. | 429/319 |
| 2013/0137010 A1 | 5/2013 | Aitken et al. | 429/486 |
| 2013/0273430 A1 | 10/2013 | Axelbaum et al. | 429/224 |

OTHER PUBLICATIONS

L. Huang, et al., "Electrochemical properties of $Li_{1.4}Al_{0.4}Ti_{1.6}(PO_4)_3$ synthesized by a co-precipitation method", *Journal of Power Sources*, 2011, vol. 196, pp. 6943-6946.

T. Seeger, et al., "Gas phase temperature measurements in a flame spray pyrolysis process by $O_2$ pure rotational CARS", *Lasers, Sources, and Related Photonic Devices Technical Digest*, 2012, pp. 1-3.

X. Xu, et al., "Preparation and electrical properties of NASICON-type structured $Li_{1.4}Al_{0.4}Ti_{1.6}(PO_4)_3$ glass-ceramics by the citric acid-assisted sol-gel method", *Solid State Ionics*, 2007, vol. 178, pp. 29-34.

X. Xu, et al., "High lithium ion conductivity glass-ceramics in $Li_2O$—$Al_2O_3$—$TiO_2$—$P_2O_5$ from nanoscaled glassy powders by mechanical milling", *Solid State Ionics*, 2006, vol. 177, pp. 2611-2615.

(Continued)

*Primary Examiner* — Mary F Theisen
(74) *Attorney, Agent, or Firm* — Michael W. Russell (57) ABSTRACT

A flame spray pyrolysis method for making nanoscale, lithium ion-conductive ceramic powders comprises providing a precursor solution comprising chemical precursors dissolved in an organic solvent, and spraying the precursor solution into an oxidizing flame to form a nanoscale, lithium ion-conductive ceramic powder, wherein a concentration of the chemical precursors in the solvent ranges from 1 to 20 M. The precursor solution can comprise 1-20% excess lithium with respect to a stoichiometric composition of the ceramic powder. Nominal compositions of the nanoscale, ceramic powders are $Li_{1.4}Al_{0.4}M_{1.6}(PO_4)_3$ where M is Ti or Ge.

16 Claims, 5 Drawing Sheets

(56) References Cited

OTHER PUBLICATIONS

X. Xu, et al., "Preparation of Nanostructured $Li_{1.4}Al_{0.4}Ti_{1.6}(PO_4)_3$ Glass-Ceramics by a Citrate Process", 2005, vol. 34, No. 4, pp. 512-513.

F.O. Erast, et al., "Electrochemically active flame-made nanosized spinels: $LiMn_2O_4$, $Li_4Ti_5O_{12}$ and $LiFe_5O_8$", *Materials Chemistry and Physics*, 2007, vol. 101, pp. 372-378.

J.H. Kim, et al., "Electrochemical properties of nano-sized $LiNi_{1/3}Co_{1/3}Mn_{1/3}O_2$ powders in the range from 56 to 101 nm prepared by flame spray pyrolysis", *Materials Chemistry and Physics*, 2012, vol. 134, pp. 254-259.

C.R. Mariappan, et al., "Correlation between micro-structural properties and ionic conductivity of $Li_{1.5}Al_{0.5}Ge1.5(PO_4)_3$ ceramics", *Journal of Prover Sources*, 2011, vol. 196, pp. 6456-6464.

K. Takahashi, et al., "A Super High Lithium Ion Conducting Solid Electrolyte of Grain Boundary Modified $Li_{1.4}Ti_{1.6}Al_{0.4}(PO_4)_3$", *Journal of the Electrochemical Society*, 2012, vol. 159, No. 4, pp. A342-A348.

PCT/US13/061585, PCT Search Report dated Jan. 10, 2014.

* cited by examiner

FLAME SPRAY PYROLYSIS METHOD FOR FORMING NANOSCALE LITHIUM METAL PHOSPHATE POWDERS

BACKGROUND

The present disclosure relates generally to a method for forming ceramic powders, and more particularly to a flame spray pyrolysis method for forming lithium metal phosphate ceramic powders. Such powders can have nanoscale particle sizes and can be used to form lithium ion-conductive ceramic membranes. For instance, as disclosed herein, effective Li ion-conductive ceramics include lithium aluminum titanium phosphate (LATP), which can include materials having the nominal composition $Li_{1.4}Al_{0.4}Ti_{1.6}(PO_4)_3$, and lithium aluminum germanium phosphate (LAGP), which can include materials having the nominal composition $Li_{1.4}Al_{0.4}Ge_{1.6}(PO_4)_3$.

Powders of suitable ceramic compositions can be cast and sintered to form physically and chemically-durable membranes. Lithium ion-conductive membranes can be used in Li-air and Li-seawater batteries, for example, where the membrane separates air or water from the metallic lithium metal anode inside the cell. Ceramic Li ion-conductive membrane can also be used in a complete solid state Li-ion battery as a substitute for the polymeric membrane.

Conventionally, LATP and LAGP membranes are made by a glass ceramic route where related precursors (e.g., oxides, carbides, $NH_4H_2PO_4$, etc.) are mixed and melted at elevated temperatures (e.g., 1500° C.) and then quenched. The resulting glass is milled into a powder, which can typically have micro-scale particle sizes. The powder is heat treated to crystallize it into a glass ceramic. The glass ceramic can be tape-cast to form a film that, in turn, is heated (e.g., to 800-900° C.) and sintered to form a dense membrane. With this glass ceramic approach, however, a high melting temperature is needed to melt the precursor materials, and the quenching step has to be precisely controlled to form the glass phase.

Glass phase LATP and LAGP powders can also be made by a sol-gel process. The resulting powder can be crystallized and formed into a dense membrane, though this method can be difficult to scale-up. A further method for making crystallized LATP powders is a co-precipitation method. The co-precipitation method can be used to directly tape cast a sinterable film. However, the co-precipitation method generally results in particle sizes that are too large for membrane durability in sea water applications.

Flame spray pyrolysis (FSP) may be used to form powder materials from chemical precursors, though the FSP approach may be difficult to apply to precursors that contain highly-volatile constituents such as lithium due to the high temperature conditions in the flame and the attendant difficult in retaining the volatile components in the final product. In view of the foregoing, it would be beneficial to develop a flame spray pyrolysis process for forming stoichiometric (non-lithium deficient) LATP and LAGP nanoscale powders. Such powders can be conductive to lithium ions and can be incorporated into ceramic membranes for advanced lithium battery applications for example. As disclosed herein, the LATP and LAGP powders can be formed with a small (<50 nm diameter) particle size, and have been shown to be effective sintering aids in forming LATP or LAGP membranes.

SUMMARY

A flame spray pyrolysis method is disclosed for making lithium metal phosphate ceramic powders. According to embodiments of the method, a precursor solution is prepared by dissolving Li, Al, Ti (or Ge) and P precursors in an appropriate solvent. The precursor solution is then aerosolized and combusted in a flame where the precursor materials react and form crystalline lithium aluminum titanium phosphate (or lithium aluminum germanium phosphate) ceramic powders.

LATP or LAGP powders can be prepared using a precursor solution that has a total chemical precursor concentration in the range of 1.5 to 5.5 M, e.g., 2 to 4 M or 2.5 to 3.5 M.

Example precursors include LiCl, lithium t-butoxide, $AlCl_3$, aluminum tri-sec-butoxide, titanium isopropoxide, germanium ethoxide, trimethyl phosphate and triethyl phosphate, though other suitable precursors can be used. Example solvents include ethanol, isopropanol, 2-methoxyethonal, as well as combinations thereof.

In embodiments, the amount of lithium in the precursor solution is controlled in order to produce a desired lithium content in the resulting powder. Because lithium is a volatile species, too low an amount of lithium in the precursor solution may result in insufficient incorporation of lithium into the resultant powder, while too high an amount of lithium may result in a combustion temperature that is insufficient to reactively form LATP (or LAGP) powder with $LiTi_2(PO_4)_3$ (or $LiGe_2(PO_4)_3$) as the major phase. By way of example, 1-20% of over-batching of the Li precursor with respect to the phosphorus content in the precursor solution can be used to produce the desired stoichiometry in the final powder. In general, lower amounts of lithium precursor over-batching can be used with higher concentration precursor solutions.

In an example process, the precursor solution, which can be entrained in a carrier gas such as oxygen, is sprayed through a nozzle where it is aerosolized and reacted with an oxidizing gas such as oxygen. An additional gas mixture of $O_2$ and $CH_4$ can be used to ignite the combustion flame and promote the reaction between the aerosolized precursors. The precursors decompose and react in the flame to form a nanoscale ceramic powder.

The flame spray pyrolysis process is readily scalable and can be used to synthesize nanoscale powders of LATP and LAGP. These fine particle size powders can be used directly to form ceramic membranes or, in conjunction with larger particle size powders, as sintering aids to make LATP or LAGP membranes.

An example method comprises providing a precursor solution of chemical precursors dissolved in an organic solvent, and spraying the precursor solution into an oxidizing flame to form a nanoscale, lithium ion-conductive ceramic powder, where a concentration of the chemical precursors in the solvent ranges from 1.5 to 5.5 M. In embodiments involving the formation of LATP powder, a lithium precursor can be incorporated into the precursor solution in an amount equal to 10-20% of a stoichiometric excess. In embodiments involving the formation of LAGP powder, a lithium precursor can be incorporated into the precursor solution in an amount equal to 1-10% of a stoichiometric excess.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

Flame spray pyrolysis (FSP) has been adapted to enable the synthesis of lithium ion-conductive ceramic powders having a desired composition by using a defined mixture of chemical precursors. In some embodiments, precursor solutions have been developed that can sustain a flame at a suitable pyrolysis temperatures and result in the formation of dimensionally and compositionally-uniform nanoscale ceramic particles.

The FSP approach has been used to produce lithium aluminum titanium phosphate (LATP) and lithium aluminum germanium phosphate (LAGP) ceramic powders. It has been shown that stoichiometric or near-stoichiometric $LiTi_2(PO_4)_3$ and $LiGe_2(PO_4)_3$ phases can be formed by providing a precursor solution having a total precursor concentration in an organic solvent of 1.5-5.5 M. The amount in solution of the lithium-containing chemical precursor is adjusted to be within a range of 1 to 20% in excess of stoichiometry with respect to the precursor solution's phosphorus content for the formation of $LiTi_2(PO_4)_3$ or $LiGe_2(PO_4)_3$.

A flame spray pyrolysis reactor generally comprises a reaction chamber, a precursor delivery system and a collection system. In embodiments, the reaction chamber can be open to the environment, and air can be drawn into the reaction chamber from the surroundings to supply additional oxygen to the flame and/or to contribute to cooling of the product particles as they exit the flame.

The precursor delivery system generates an aerosol of the precursor solution at a nozzle. The aerosolized precursor solution provides both the fuel that feeds the flame and the chemical constituents that react to form the nanoscale particles.

A particle collector can be attached to the system. For example, a gravity-fed container can be attached to the system, or the flow of particles can be directed through an optional filter element using a pump, blower or the like into a suitable particle collection means. An example process involves providing a precursor solution comprising chemical precursors dissolved in an organic solvent, and spraying the precursor solution into an oxidizing flame where the precursors combust and react to form a nanoscale, lithium ion-conductive ceramic powder.

Figure 1:
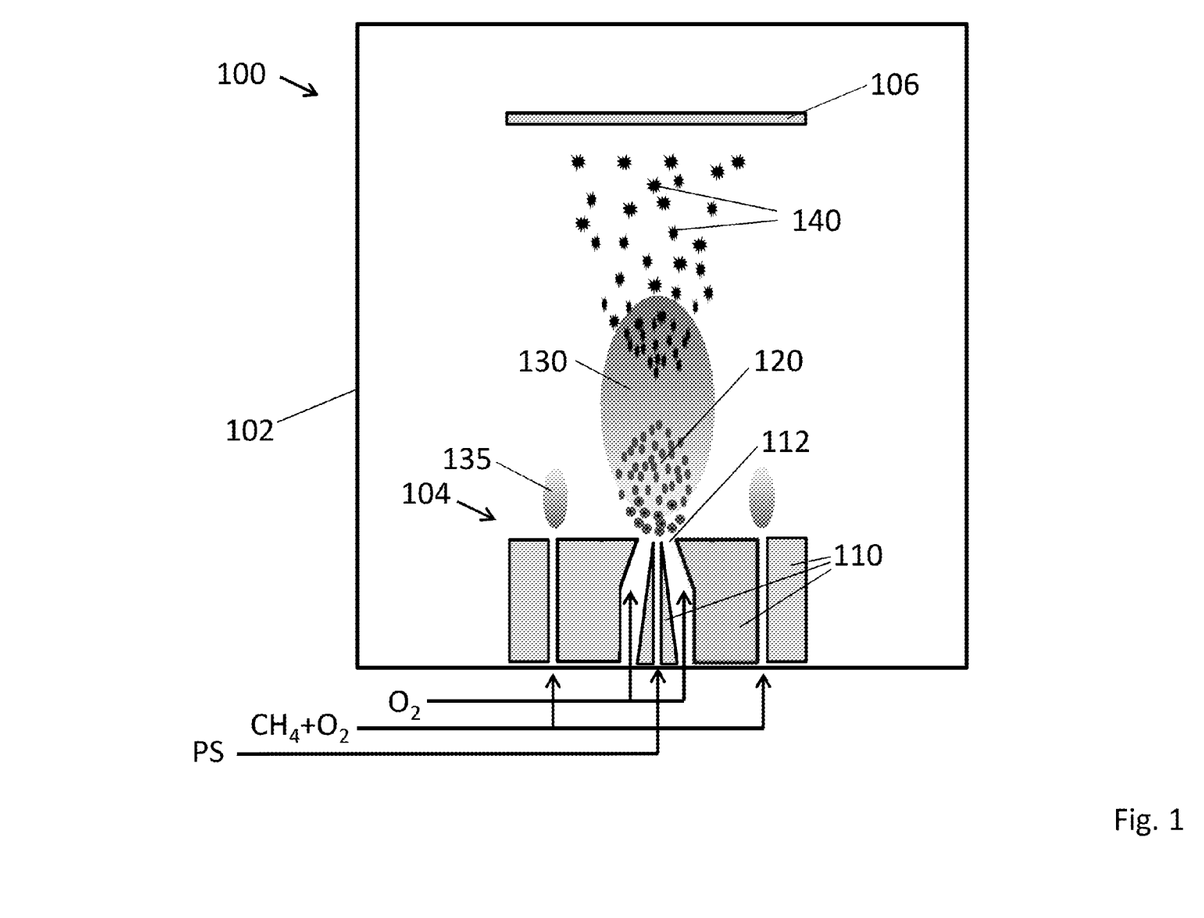
FIG. 1 is a schematic of a flame spray pyrolysis apparatus.

Referring to FIG. 1, an embodiment of a flame spray pyrolysis apparatus is shown schematically. Apparatus 100 comprises a reaction chamber 102, precursor delivery system 104 and collection/exhaust system 106. Reaction chamber 102 generally comprises an ignition source 110, which can be a gas torch, an electric arc, a laser beam or the like. A gas torch, for instance, can provide a stable flame for particle production, and a suitable gas torch can comprise a multi-channel element that, in addition to the precursor solution, is supplied with oxygen or air in one channel and a flammable gas, such as hydrogen, methane or natural gas, in another channel.

In the illustrated embodiment, ignition source 110 comprises a nozzle 112 having a plurality of channels through which a precursor solution (PS) is provided together with gaseous fuel. Nozzle 112 is configured to form an aerosol 120 of the precursor solution within the reaction chamber. A primary combustion flame 130 is formed from a mixture of oxygen gas and aerosolized precursor solution. For instance, the precursor solution can be pumped through a FSP main nozzle and sprayed out by pressurized oxygen. Peripheral to the primary combustion flame 130, a pilot flame 135, which is derived from a gaseous mixture of $CH_4$ and $O_2$, can mix with and support the combustion of the primary flame 130 such that components of the precursor solution react to form nanoscale ceramic powder particles 140. The nozzle 112 may be cooled to prevent pre-reaction or decomposition of the precursor solution prior to atomization. An inert gas shield, such as a nitrogen gas shield, may be provided between the $CH_4+O_2$ and atomizing $O_2$ gas flows to prevent combustion at the face of the nozzle. An example nitrogen gas shield flow rate is about 10 slpm.

The particles 140 can be collected by collection/exhaust system 106. The collection/exhaust system 106 may include a thermophoretic-surface collector. Such a collector may be formed using one or more quartz barrels having an inlet that is directed tangential to an inner surface. In operation, the powder particles are collected across the inner surface of the barrels. During collection, the collector may be heated, for example, to a temperature greater than 100° C.

The flame within the reaction chamber can be oriented in a selected direction, which generally can be any direction, such as upward, downward or horizontal, that provides an appropriate interface with the collection system. Reaction chamber 102 can be formed from appropriate heat resistant materials such as ceramic or glass materials. The reaction chamber components or portions thereof may be externally cooled. Nozzle 112 generally is formed from one or more materials that can tolerate high flame temperatures.

The chemical precursors can be metal compounds that provide the metal elements for the formation of the ceramic particles. The precursors generally can be dissolved into an appropriate solvent. For the formation LATP or LAGP nanoscale powders, a plurality of metal elements is provided by one or more chemical precursors. The concentration of the precursors and the amount and type of solvent can be adjusted to balance the composition and rheology of the precursor solution, the delivery rate of the elements into the flame, and the ability to deliver sufficient fuel to maintain the flame at a desired temperature.

The precursor solution may include respective chemical precursors for each of the Li, Al, Ti (or Ge) and P constituents of the final ceramic powder. Example chemical precursors include LiCl, lithium t-butoxide, $AlCl_3$, aluminum tri-secbutoxide, titanium isopropoxide, germanium ethoxide, trimethyl phosphate (TMP) and triethyl phosphate (TEP), though other suitable precursors can be used.

A precursor solution can be formed by dissolving the chemical precursors in a suitable organic solvent. Example combustible solvents include ethanol, isopropanol, 2-methoxyethonal, as well as mixtures thereof.

Lithium is a highly volatile constituent of both LATP and LAGP materials. To compensate for the volatility, excess Li can be added to the precursor solution. The inventors have demonstrated that LATP or LAGP nanoscale ceramic powders can be formed by controlling the overall concentration of the precursor solution as well as the amount of the lithium component in the precursor solution. Because the choice of solvent will impact the flame temperature, the amount of a given solvent in the precursor solution can impact the incorporation of volatile species. Specifically, for high concentrations of the chemical precursors, the flame temperature may not be high enough to fully react the reactants, while for low concentrations chemical precursors, the flame temperature may be too high to retain the volatile component(s).

For making LATP or LAGP by FSP, a total concentration of chemical precursors in the precursor solution can range from 1.5 to 5.5 M. In order to provide a suitable flame temperature for the reaction and form the desired phase, in embodiments a total concentration of chemical precursors in the precursor solution can be 1.5, 2, 2.5, 3, 3.5, 4, 4.5, 5 or 5.5 M.

Independent of the overall concentration of reactants in the precursor solution, an amount of Li precursor can be 1 to 20% in excess of a stoichiometric amount relative to the P precursor content in the precursor solution. In embodiments related to the formation of LATP powder, for example, the lithium precursor can be incorporated into the precursor solution in an amount equal to 10-20% of stoichiometric excess. In alternate embodiments involving the formation of LAGP powder, the lithium precursor can be incorporated into the precursor solution in an amount equal to 1-10% of stoichiometric excess.

In such processes, the collected powder can have $LiTi_2(PO_4)_3$ (or $LiGe_2(PO_4)_3$) as the major crystallographic phase. Additional phases may be present. For example, minor phase constituents such as $AlPO_4$ can form in the FSP process. Empirical results have shown that the formation of minority phases tends to be favored at lower relative flame temperatures. Specifically, lower flame temperatures can result from precursor solutions having a relatively high concentration of chemical reactants (low relative amount of solvent), which can lead to incomplete chemical reaction among the reactants.

In embodiments, the flame temperature during the FSP synthesis can be at least 800° C. and less than 2100° C., e.g., greater than or equal to 800, 1000, 1200, 1400, 1600, 1800 or 2000° C. In further embodiments, the flame temperature can be in the range of 1000 to 2000° C., such as in the range of 1200 to 1600° C.

Two measurements can be used to evaluate the powder product: (1) overall elemental composition and (2) phase identification. A nominal target composition of the product ceramic powders is $Li_{1.4}Al_{0.4}Ti_{1.6}(PO_4)_3$ (or $Li_{1.4}Al_{0.4}Ge_{1.6}(PO_4)_3$), though nanoscale ceramic powders made according to the disclosed method may have a composition expressed as $Li_xAl_{2-y}Ti_y(PO_4)_3$ or $Li_xAl_{2-y}Ge_y(PO_4)_3$, where $1 \leq x \leq 2$ and $1.3 \leq y \leq 1.9$.

The minority phases, which may be water soluble and thus potentially deleterious to the durability of a final ceramic membrane, can be removed from the powder. In embodiments, a water-extraction method is used to remove soluble material from the as-synthesized powder. By way of example, as-prepared ceramic powders can be rinsed with high-purity, high-resistance, deionized water, to leach out soluble content. The water can have a resistance of at least 10 MΩ or at least 15 MΩ. In an initial rinsing step, the nanoscale powder can form aggregates that can, in turn, be rinsed as the initial rinsing step continues or by using a separate, second rinsing step.

Nanoscale ceramic particles made using the disclosed method can have an average particle size of less than 100 nm or less than 50 nm, i.e., ranging from about 5 nm to 100 nm or about 10 nm to 50 nm.

Optional post-synthesis refining of the nanoscale ceramic powder can be performed to modify the phase(s) and/or grain structure of the material. For example, the powder material can be heated in a post-synthesis heat treatment step at a temperature greater than 700° C., e.g., at a temperature ranging from about 700° C. to 1000° C. in air or oxygen. Such a heat treatment step may crystalline glassy phases within the powder or convert one crystalline phase to another.

Nanoscale LATP or LAGP powders can be tape-cast to form a green body. The green body can be sintered to form a dense lithium ion-conductive ceramic membrane.

Embodiments of the disclosure are illustrated with reference to the following examples.

EXAMPLE 1

Comparative

A precursor solution was prepared by dissolving Li t-butoxide, Al tri-sec-butoxide, Ti isopropoxide and trimethyl phosphate in 2-methoxyethanol. The total concentration of chemical precursors in the solution was 1.4M. Relative to the phosphorus content in the precursor solution, the amount of Li t-butoxide was 34% in excess of the stoichiometric amount to form $LiTi_2(PO_4)_3$.

Figure 2:
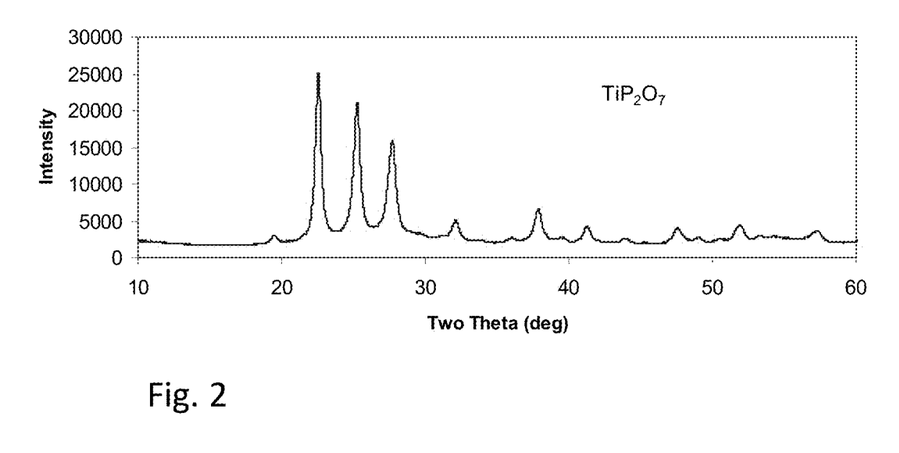
FIG. 2 is an x-ray diffraction scan of $TiP_2O_7$ nanoscale powder made using a comparative process with 34% excess lithium precursor in the precursor solution.

For the flame spray pyrolysis process, the precursor solution was entrained in oxygen gas flowing at a flow rate of 20 slpm such that the flow rate of the precursor solution was 10 ml/min. A pilot flame was generated using a co-flow of $CH_4$ and $O_2$. The $CH_4$ and $O_2$ flow rates for the pilot flame were 5.2 slpm and 5.0 slpm, respectively. FIG. 2 shows an XRD scan of the resulting powder product, which is essentially pure $TiP_2O_7$.

Although the precursor solution contained excess lithium, the final powder was heavily Li deficient. Without wishing to be bound by theory, it is believed that the relatively low overall concentration of the precursor solution in combination with the excess Li t-butoxide resulted in a flame temperature that was too high for efficient incorporation of lithium into the powder. Instead, the elevated flame temperature resulted in vaporization of the lithium rather than incorporation into the powder.

EXAMPLE 2

Comparative

In a second comparative example, nanoscale powder was made using a precursor solution comprising Li t-butoxide, Al tri-sec-butoxide, Ti isopropoxide and trimethyl phosphate in 2-methoxyethanol. The lithium (Li t-butoxide) content in the precursor solution was about 19% in excess of a stoichiometric amount with respect to the phosphorus content in the precursor solution. The total concentration of all chemical precursors in the precursor solution was 5.7M.

In the FSP process, the flow rate of the precursor solution was 10 ml/min. The precursor solution was entrained in oxygen gas flowing at a flow rate of 20 slpm. The pilot flame was generated using a co-flow of $CH_4$ and $O_2$. The $CH_4$ and $O_2$ flow rates for the pilot flame were 5.2 slpm and 5.0 slpm, respectively.

Figure 3:
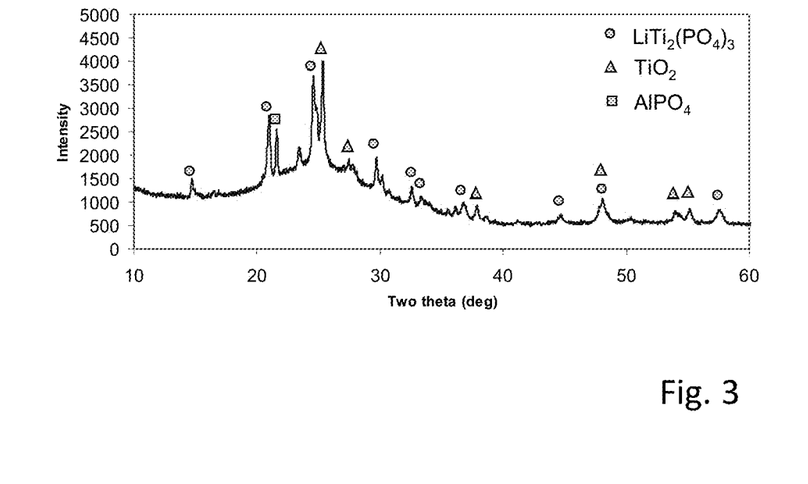
FIG. 3 is an x-ray diffraction scan of a ceramic powder produced from a comparative process using a 5.7M precursor solution.

Although the amount of Li t-butoxide in this example was decreased to 19% excess, the resulting nanoscale powder was lithium rich. An x-ray diffraction scan of the powder is shown in FIG. 3. The x-ray reflections are consistent with multiple major phases, including LATP, $TiO_2$ and several glass phases including $AlPO_4$. It is believed that the example 2 process conditions, including the relatively high concentration (5.7M) of chemical precursors in the precursor solution, resulted in too low a flame temperature to allow the precursors to fully react and form the $LiTi_2(PO_4)_3$ phase.

EXAMPLE 3

Powder 3 was made from a 2.8 M precursor solution of Li t-butoxide, Al tri-sec-butoxide, Ti isopropoxide and trimethyl phosphate dissolved in 2-methoxyethanol where the Li t-butoxide precursor was included in an amount equal to 13% in excess of the stoichiometric amount. The precursor solution was delivered to the FSP nozzle at a flow rate of 12.5 ml/min by entraining the precursor solution in oxygen gas flowing at a 20 slpm. The pilot flame was generated using a co-flow of $CH_4$ and $O_2$ that were provided at respective flow rates of 5.2 slpm and 5.0 slpm. The pressure differential for the spray was about 1 bar.

Figure 4:
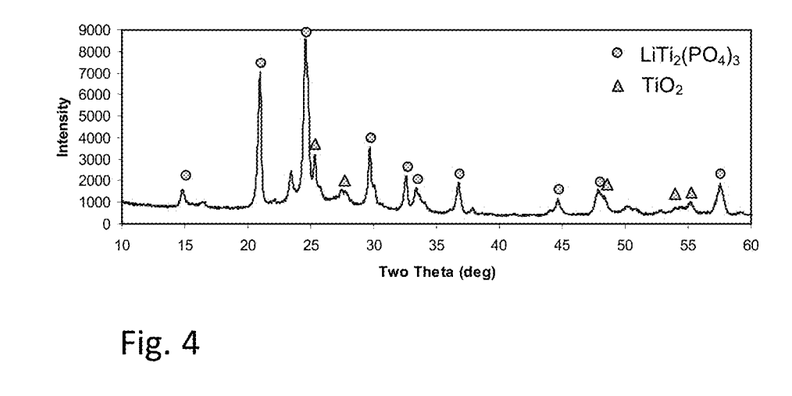
FIG. 4 is an x-ray diffraction scan of an example nanoscale ceramic powder having $LiTi_2(PO_4)_3$ as the major constituent phase.

As seen with reference to FIG. 4, the nanoscale ceramic powder of example 3 includes $LiTi_2(PO_4)_3$ as the dominant product phase.

EXAMPLE 4

Figure 5:
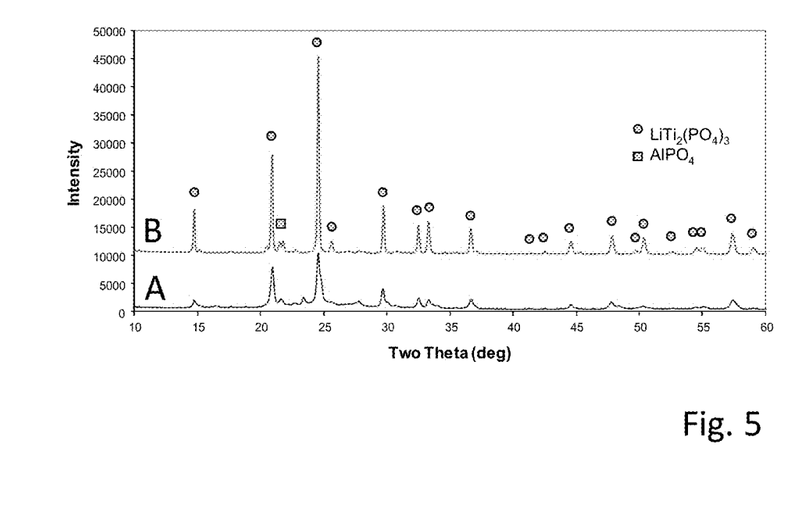
FIG. 5 shows x-ray diffraction scans of nanoscale ceramic powders (a) as prepared by FSP and (b) after calcination. The major constituent phase is $LiTi_2(PO_4)_3$.

Powder 4 was made using a precursor solution (2.7M) comprising lithium chloride (LiCl), Al tri-sec-butoxide, Ti isopropoxide and trimethyl phosphate dissolved in ethanol. The amount of the lithium precursor was 18% in excess of the stoichiometric amount. Referring to FIG. 5, although trace $AlPO_4$ is found in the as-prepared nanoscale powder sample (curve A), x-ray reflections are consistent with $LiTi_2(PO_4)_3$ as the major phase.

An x-ray diffraction scan of powder 4 after being heat-treated for 2 hrs. at 700° C. is shown in curve B. As a result of the heat treatment, the crystallite size in the powder material increases as evidenced by the sharpening of the x-ray peaks.

EXAMPLE 5

As discussed above, secondary phases such as $AlPO_4$ are not desirable for forming ceramic membranes because, for instance, the $AlPO_4$ phase is water soluble and if incorporated into a ceramic membrane can diminish the membrane's durability. Because the $AlPO_4$ phase dissolves in water (and LATP does not) a water-extraction method can be used to purify the powder.

An example water extraction method involves initially forming aggregates of the nanoscale powder material by rinsing the powder with water at room temperature and then further rinsing the aggregate material with water at room temperature.

Figure 6:
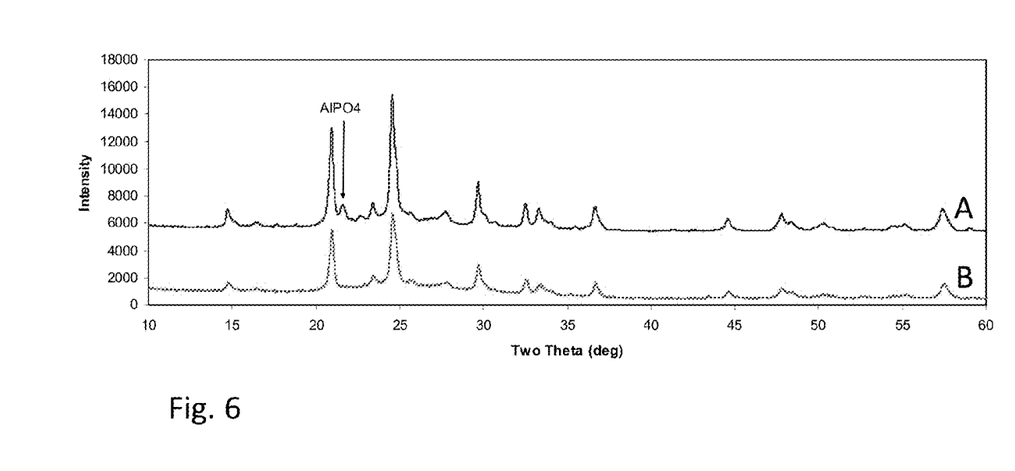
FIG. 6 shows x-ray diffraction scans of nanoscale ceramic powders (a) as prepared by FSP and containing trace amounts of $AlPO_4$, and (b) after washing with water.

FIG. 6 shows two x-ray diffraction scans from two powder samples. Curve A in FIG. 6 corresponds to an as-prepared powder sample that has $LiTi_2(PO_4)_3$ as the dominant phase, but which includes $AlPO_4$. As seen with reference to curve B, after the as-prepared powder sample is washed with 18 MΩ water, the $AlPO_4$ phase is absent.

EXAMPLE 6

Figure 7:
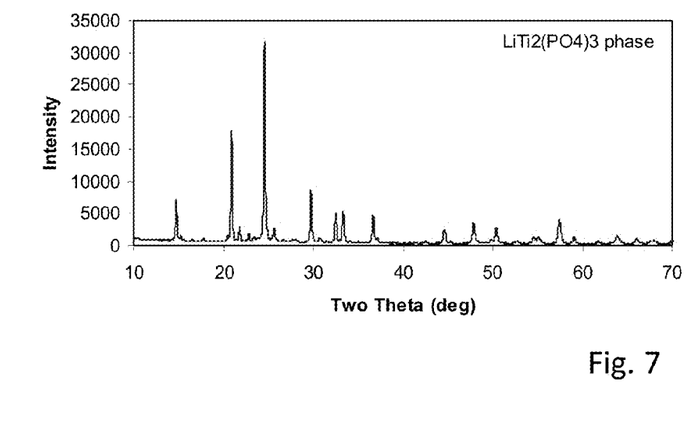
FIG. 7 is an x-ray diffraction scan of $LiTi_2(PO_4)_3$ nanoscale powder after calcination at 700° C. for 2 hrs.

Powder samples that are produced at low flame temperatures and which contain impurity phases (see, e.g., Example 2, FIG. 3) can be converted to the $LiTi_2(PO_4)_3$ (or $LiGe_2(PO_4)_3$) phase by a post-synthesis heat treatment step. An x-ray diffraction scan of powder 2 after being heat-treated for 2 hrs. at 700° C. is shown in FIG. 7. The post-synthesis heat treatment allows the constituents of the powder to fully react and form LATP with $LiTi_2(PO_4)_3$ as the majority phase. A summary of LATP synthesis conditions and resulting powder compositions are provided in Table 1.

TABLE 1

Precursor solutions and sample data for LATP powders made by FSP

| | Precursors | Solvent | Solution concentration | P/(Al + Ti) | Ti/Al | P/Li | Major phase(s) | Powder composition |
|---|---|---|---|---|---|---|---|---|
| Target | | | | 1.5 | 4 | 2.14 | $LiTi_2(PO_4)_3$ | $Li_{1.4}Al_{0.4}Ti_{1.6}(PO_4)_3$ |
| Powder 1 - comparative | Li t-butoxide, Al tri-sec-butoxide, Ti isopropoxide, TMP | 2-methoxy ethanol | 1.4M | 1.48 | 4.12 | 1.6 | $TiP_2O_7$ | $Li_{0.53}Al_{0.23}Ti_{1.25}(PO_4)_3$ |
| Powder 2 - comparative | Li t-butoxide, Al tri-sec-butoxide, Ti isopropoxide, TMP | 2-methoxy ethanol | 5.7M | 1.65 | 3.27 | 1.8 | $LiTi_2(PO_4)_3$ & $TiO_2$ & glass phase | $Li_{1.55}Al_{0.42}Ti_{1.31}(PO_4)_3$ |
| Powder 3 | Li t-butoxide, Al tri-sec-butoxide, Ti isopropoxide, TMP | 2-methoxy ethanol | 2.8M | 1.71 | 3.41 | 1.89 | $LiTi_2(PO_4)_3$ | $Li_{1.45}Al_{0.39}Ti_{1.62}(PO_4)_3$ |
| Powder 4 | LiCl, Al tri-sec-butoxide, Ti isopropoxide, TMP | Ethanol | 2.7M | 1.65 | 3.27 | 1.82 | $LiTi_2(PO_4)_3$ | $Li_{1.28}Al_{0.42}Ti_{1.36}(PO_4)_3$ |

EXAMPLE 7

Figure 8:
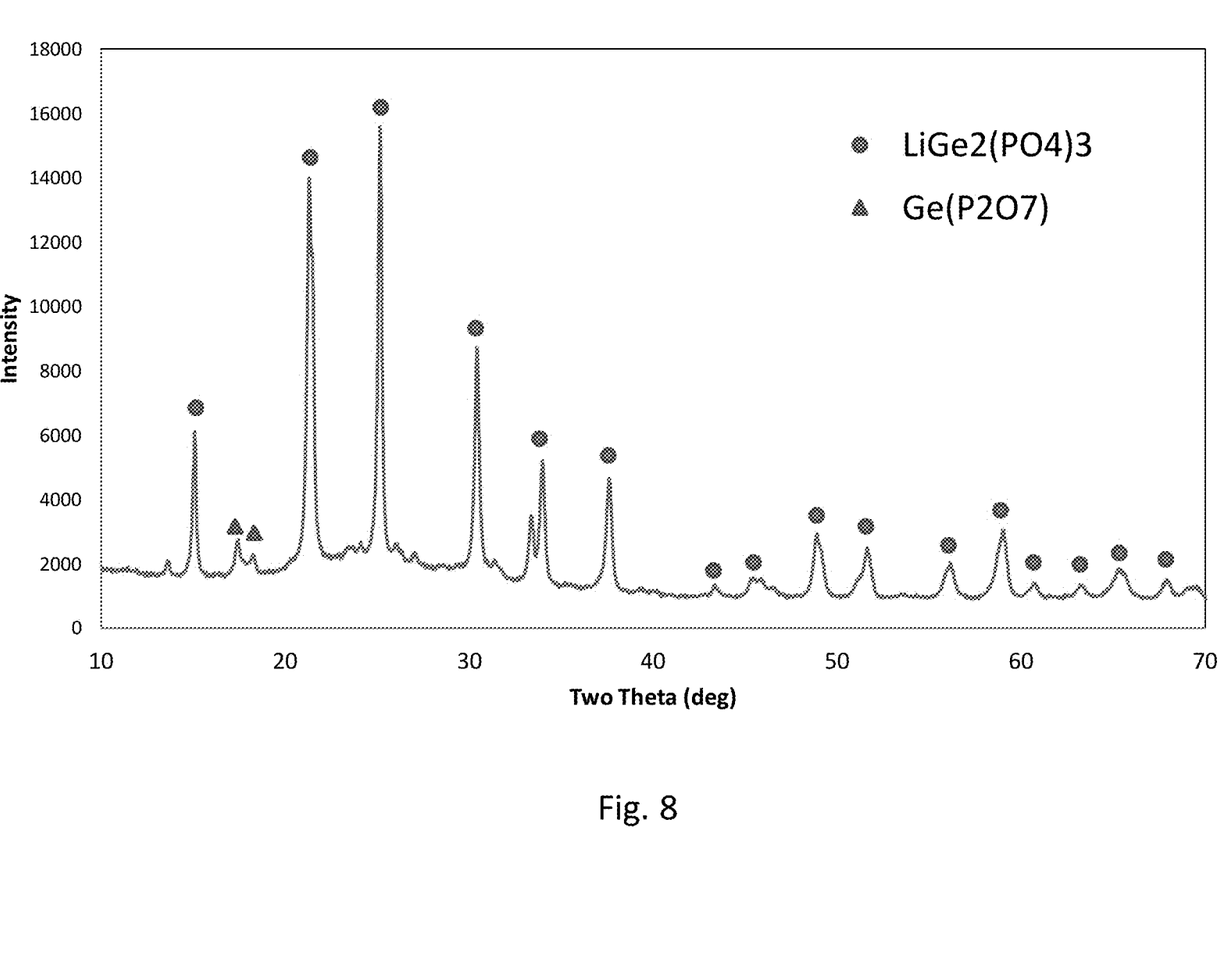
FIG. 8 is an x-ray diffraction scan of LAGP nanoscale powder made by FSP.

LAGP powder can be made by FSP. FIG. 8 shows x-ray data for LAGP powder made by FSP using the precursor solution described in Table 2. The overall solution concentration was 3.2 M, and the Li precursor was 2% in excess of the stoichiometric amount for Li relative to phosphorus.

Generally, LAGP can be formed at lower flame temperatures than LATP because the Ge precursor (Ge ethoxide) decomposes at comparatively lower temperatures. In addition to the lower Ge precursor decomposition temperature associated with LAGP synthesis, LAGP powders may be prepared using a lower stoichiometric excess of lithium. Also, in LAGP embodiments, the amount of Ge precursor in the precursor solution is comparatively less than the amount of Ti used in the LATP synthesis.

TABLE 2

Precursor solutions and sample data for LAGP powders made by FSP

| | Precursors | Solvent | Solution concentration | P/(Al + Ge) | Ge/Al | P/Li | Major phases | Final powder |
|---|---|---|---|---|---|---|---|---|
| Target | | | | 1.5 | 4 | 2.14 | $LiGe_2(PO_4)_3$ | $Li_{1.4}Al_{0.4}Ge_{1.6}(PO_4)_3$ |
| Powder 5 | Li t-butoxide, Al tri-sec-butoxide, Ge ethoxide | 2-methoxy ethanol | 3.2M | 1.7 | 2.8 | 2.1 | $LiGe_2(PO_4)_3$ | $Li_{1.3}Al_{0.4}Ge_{1.6}(PO_4)_3$ |

As used herein, the singular forms "a," "an" and "the" include plural referents unless the context clearly dictates otherwise. Thus, for example, reference to a "precursor" includes examples having two or more such "precursors" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a carbon feedstock that comprises a carbonized material include embodiments where a carbon feedstock consists of a carbonized material and embodiments where a carbon feedstock consists essentially of a carbonized material.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for making nanoscale, lithium ion-conductive ceramic powders, comprising:
   providing a precursor solution comprising chemical precursors dissolved in an organic solvent;
   spraying the precursor solution into an oxidizing flame to form a nanoscale, lithium ion-conductive ceramic powder; and
   forming the ceramic powder into a green body and sintering the green body to form a lithium ion-conductive ceramic membrane, wherein a concentration of the chemical precursors in the precursor solution ranges from 1.5 to 5.5 M.

2. The method according to claim 1, wherein the chemical precursor concentration in the precursor solution ranges from 2 to 4 M.

3. The method according to claim 1, wherein the chemical precursors are selected from the group consisting of LiCl, lithium t-butoxide, $AlCl_3$, aluminum tri-sec-butoxide, titanium isopropoxide, germanium ethoxide, trimethyl phosphate and triethyl phosphate.

4. The method according to claim 1, wherein the solvent is selected from the group consisting of ethanol, isopropanol and 2-methoxyethanol.

5. The method according to claim 1, wherein an amount of lithium in the precursor solution is from 1 to 20% in excess of a stoichiometric amount with respect to an amount of phosphorus in the precursor solution.

6. The method according to claim 1, wherein an amount of lithium in the precursor solution is from 1 to 10% in excess of a stoichiometric amount with respect to an amount of phosphorus in the precursor solution.

7. The method according to claim 1, wherein an amount of lithium in the precursor solution is from 10 to 20% in excess of a stoichiometric amount with respect to an amount of phosphorus in the precursor solution.

8. The method according to claim 1, further comprising washing the ceramic powder with water having a resistance of at least 10 M-ohm.

9. The method according to claim 1, further comprising heating the ceramic powder at a temperature ranging from about 700° C. to 1000° C.

10. The method according to claim 1, wherein a composition of the ceramic powder has a formula $Li_xAl_{2-y}M_y(PO_4)_3$, where M is Ti or Ge, $1 \leq x \leq 2$ and $1.3 \leq y \leq 1.9$.

11. A method for making nanoscale, LATP ceramic powders, comprising:
   providing a precursor solution comprising chemical precursors dissolved in an organic solvent; and
   spraying the precursor solution into an oxidizing flame to form a nanoscale, lithium ion-conductive ceramic powder, wherein a concentration of the chemical precursors in the precursor solution ranges from 1.5 to 5.5 M and an amount of lithium in the precursor solution is from 10 to 20% in excess of a stoichiometric amount with respect to an amount of phosphorus in the precursor solution.

12. The method according to claim 11, wherein the chemical precursors are selected from the group consisting of LiCl, lithium t-butoxide, $AlCl_3$, aluminum tri-sec-butoxide, titanium isopropoxide, trimethyl phosphate and triethyl phosphate.

13. The method according to claim 11, further comprising heating the ceramic powder at a temperature greater than 700° C. to refine the ceramic powder.

14. A method for making nanoscale, LAGP ceramic powders, comprising:
   providing a precursor solution comprising chemical precursors dissolved in an organic solvent; and
   spraying the precursor solution into an oxidizing flame to form a nanoscale, lithium ion-conductive ceramic powder, wherein a concentration of the chemical precursors in the precursor solution ranges from 1.5 to 5.5 M and an amount of lithium in the precursor solution is from 1 to 10% in excess of a stoichiometric amount with respect to an amount of phosphorus in the precursor solution.

15. The method according to claim 14, wherein the chemical precursors are selected from the group consisting of LiCl, lithium t-butoxide, $AlCl_3$, aluminum tri-sec-butoxide, trimethyl phosphate and triethyl phosphate.

16. The method according to claim 14, further comprising heating the ceramic powder at a temperature greater than 700° C. to refine the ceramic powder.

* * * * *